United States Patent [19]

Hettinger et al.

[11] Patent Number: 5,230,869
[45] Date of Patent: Jul. 27, 1993

[54] ADDITION OF MAGNETICALLY ACTIVE MOIETIES FOR MAGNETIC BENEFICIATION OF PARTICULATES IN FLUID BED HYDROCARBON PROCESSING

[75] Inventors: William P. Hettinger, Russell, Ky.; Roger M. Benslay, Fallston, Md.

[73] Assignee: Ashland Oil, Inc., Ashland, Ky.

[21] Appl. No.: 771,678

[22] Filed: Oct. 4, 1991

Related U.S. Application Data

[62] Division of Ser. No. 479,003, Feb. 9, 1990.

[51] Int. Cl.$^5$ ............ B03C 1/00; C10B 55/10; C10G 11/02; F27B 15/08
[52] U.S. Cl. ............ 422/144; 208/52 CT; 208/120; 208/124; 208/152; 209/8; 422/147
[58] Field of Search ........... 422/144; 208/124, 52 CT, 208/120, 152; 209/8

[56] References Cited

U.S. PATENT DOCUMENTS

| | | | |
|---|---|---|---|
| 2,348,418 | 5/1944 | Roesch et al. | 208/161 |
| 4,280,896 | 7/1981 | Bearden et al. | 208/120 |
| 4,359,379 | 11/1982 | Ushio et al. | 208/120 |
| 4,406,773 | 9/1983 | Hettinger, Jr. et al. | 208/120 |
| 4,482,450 | 11/1984 | Ushio et al. | 208/152 |

Primary Examiner—Robert J. Warden
Assistant Examiner—L. M. Crawford
Attorney, Agent, or Firm—Richard C. Willson, Jr.

[57] ABSTRACT

By continuously or intermittently adding amounts of magnetically active moieties, e.g. iron compounds, over time so that the moiety deposits on a catalyst or sorbent in a fluid catalytic cracker or similar circulating hydrocarbon conversion unit, older catalyst, being more magnetic, can be readily separated from catalyst which has been in the system a shorter time. Separation is readily accomplished by passing the catalyst and/or sorbent through a magnetic field and discarding the more magnetic 50% by wt. or more preferably 20% by wt., while recycling the remainder back to the hydrocarbon conversion unit.

7 Claims, 8 Drawing Sheets

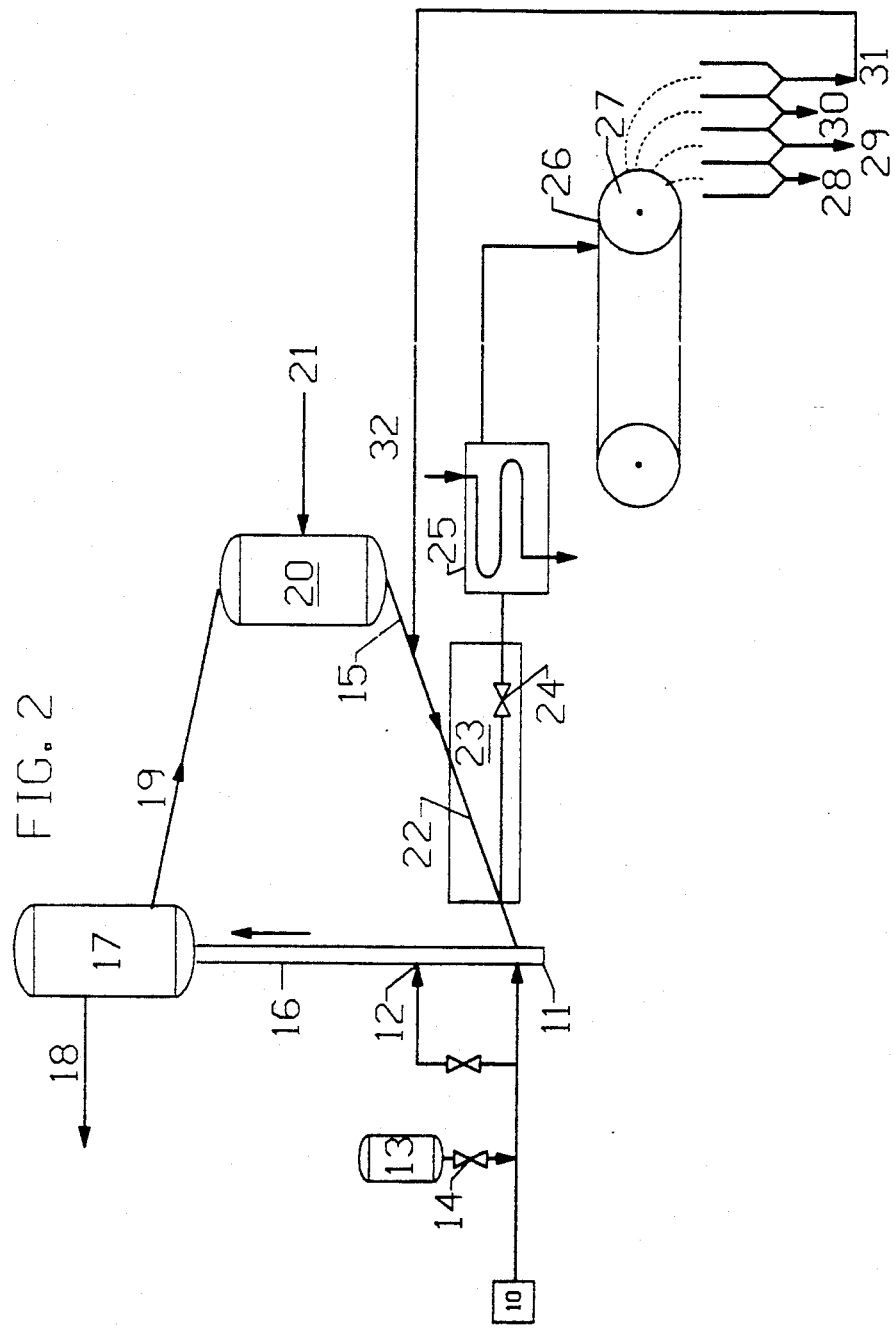

ADDITION OF MAGNETICALLY ACTIVE MOIETIES FOR MAGNETIC BENEFICIATION OF PARTICULATES IN FLUID BED HYDROCARBON PROCESSING

This application is a division of application Ser. No. 479,003, filed Feb. 9, 1990.

BACKGROUND OF INVENTION

In fluid bed particulate processing of hydrocarbon feedstocks, it is the practice to continuously add fresh particulate regularly, usually daily, and to withdraw equilibrium particulates prior to addition of fresh particulates. This provides room for the incoming fresh material.

Because of this procedure, which results in immediate complete mixing, particulates both fresh in performance and low in contaminants (usually nickel, vanadium, iron, copper, and sodium) are unavoidably withdrawn together with particulates which have been in the unit for varying times as long as two or three months or longer and have aged and drastically dropped in performance, while simultaneously accumulating deleterious metal contaminant. The industry has long felt a need to have a means by which old catalyst can be selectively removed without entrainment of fresh catalyst.

RELATED APPLICATIONS

The techniques of U.S. Ser. No. 07/332,079 filed Apr. 3, 1989 now U.S. Pat. No. 5,147,527 are useful with the present invention.

DESCRIPTION OF THE PRIOR ART

A manual search in the U.S. Patent Office, Class 55, subclass 3; Class 208, subclasses 52CT, 113, 119, 120, 121, 124, 137, 139, 140, 152, 251R, and 253; Class 209, subclasses 8, 38, 39, and 40; and Class 502, subclasses 5, 20, 21, 38, 515, 516, and 518 found principally the following references:

U.S. Pat. Nos. 4,359,379 and 4,482,450 to Ushio (assigned Nippon Oil Company), both disclosed catalytic cracking and hydrotreating processes for carbo-metallic feedstocks by depositing (adding) nickel, vanadium, iron and/or copper (originally contained in the heavy oil), and then separating the old catalyst utilizing a high gradient magnetic separator (HGMS). However the magnetizement is derived from the metals contained in the starting oil.

U.S. Pat. No. 2,348,418 (col. 2) to Roesch (Standard Oil, Indiana) regenerates catalyst by adding a magnetic substance, such as iron or nickel to the catalyst before the catalyst is introduced into a magnetic separator.

U.S. Pat. Nos. 4,292,171 and 4,294,688 both to Mayer (assigned Exxon) show catalytic reforming processes which utilize the addition of magnetizable particles to enhance catalyst separation via the use of magnetically stabilized fluidized beds.

U.S. Pat. No. 4,406,773 to Hettinger (assigned Ashland Oil) discloses magnetic separation of high activity catalyst from low activity catalyst.

U.S. Pat. No. 4,280,896 to Bearden passivates catalyst used to crack hydrocarbon feedstocks wherein nickel, vanadium and/or iron are deposited on the catalyst, but does not mention use of magnetic separation.

However, none of the above patents deliberately adds magnetically active substances such as iron at a constant rate over a period of time so that the magnetically active substance builds up on the catalyst in proportion to the age of the catalyst (the length of time the catalyst has been in the hydrocarbon conversion system) This addition of magnetic "hooks" which facilitate separation of old (lower activity) from new (recently added higher activity) catalyst is a novel feature of the present invention.

U.S. Pat. No. 4,541,920 to Seiver (Exxon) utilizes particles containing a non-ferromagnetic component and a catalytically active component composited with a ferromagnetic component so that the particles can be lined up in a magnetic field.

SUMMARY OF THE INVENTION

If a harmless magnetic substance could be continuously added to these particulates, so that it accumulates at the same rate, as for example, nickel and vanadium, it could be used to efficiently magnetically separate old particulates (those added to the system sometime back) from new (those recently added to the system, thus not heavily contaminated with metals, and therefore valuable for recycle).

This invention teaches that intentional and continuous addition of iron can be used to facilitate separation of old catalyst from new.

Our work has shown that iron contamination of reduced crude cracking catalysts and even FCC catalysts is a recurring catalytic cracking experience and this contamination has enabled us to demonstrate that iron is involved in effecting magnetic separation of used catalysts. In fact, it appears to be the major element affecting magnetic separation of old (metal contaminated) catalyst from new catalyst.

In the earlier years of fluid bed catalytic cracking, iron was considered a mild poison, especially in the presence of high sulfur, and was rated equivalent to 1/7 as deleterious as nickel. (Nickel Equivalents was expressed as equal to: Ni ppm+V ppm/4.8+Fe ppm/7.1+Cu ppm/1.23), and as it related to causing an increase in coke and gas (hydrogen make), lower gasoline yield, and lower catalyst activity.

Today, however, in cracking reduced crude containing high Conradson Carbon and high metals with state-of-the-art techniques, e.g. lift gas contacting, highly active zeolite promoted catalysts, riser reactors, (progressive flow), the vented riser and an extremely short (one to five second) residence time in the reactor, it appears that iron is not nearly as harmful as previously experienced. This is shown in FIGS. 4–6.

The invention comprises continuously adding to the feedstock or the particulate directly a given amount of iron in the range of up two to three times, and possibly more, the level of nickel and vanadium in the feedstock, and added continuously as either an organic compound such as ferrocene, or porphoryrin or a water soluble salt, such as for example, ferrous acetate, ferric formate and ferrous or ferric sulfate or by sublimation, such as Fe $Cl_3$; Iron sulfate is used for water treatment and is very inexpensive, being a waste product from titanium dioxide manufacture. Other compounds of iron, either organic, water soluble or oil soluble, may be added. Particularly preferred compounds are iron carbonyl, or the dicylopentadienyl derivative of iron, such as ferrocene.

UTILITY OF THE INVENTION

The invention is useful for prolonging the life and reducing the cost of sorbents and/or catalyst for hydrocarbon conversion.

BRIEF DESCRIPTION OF THE DRAWINGS

FIG. 2 is a schematic of a hydrocarbon cracking system having a magnetic separation system according to the invention.

FIG. 3 is a depiction of a composition of matter comprising catalyst particles and/or sorbent particles having higher and lower magnetic properties, produced according to the invention.

DETAILED DESCRIPTION OF THE INVENTION

Catalyst/Sorbent

Figure 7:
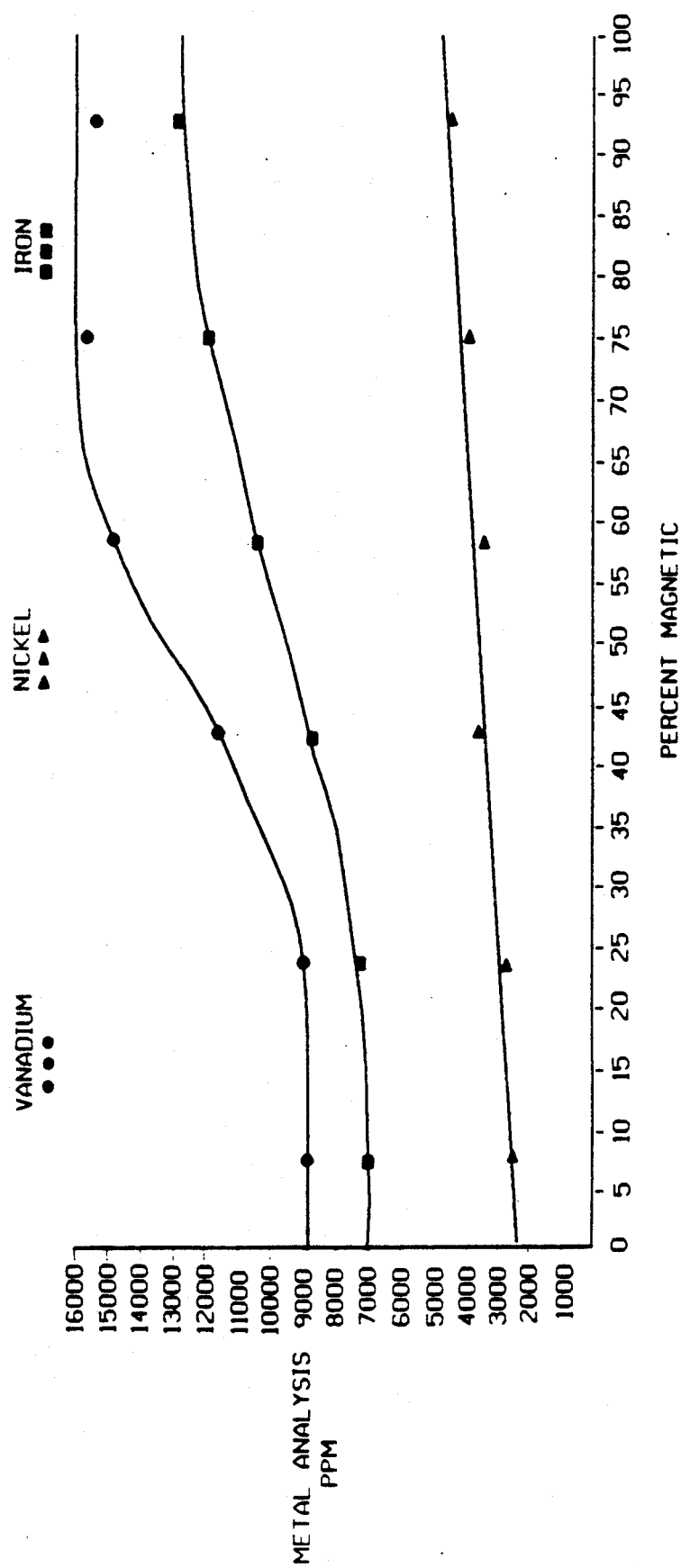
FIG. 7 is a plot showing the rare earth roller magnetic separation of a commercial sorbent used in a major metal removal system commercial unit according to the invention. Note that the more magnetic fractions do contain higher amounts of vanadium, nickel and iron.

The invention is useful for a variety of catalysts, sorbents, and even mixtures of catalyst and sorbent. Typical catalysts are those used for cracking of heavy oils, e.g. 2607B by Engelhard Corporation, DZ-40 by W. R. Grace, FOC-90 by Filtrol Corporation, etc. Some catalysts will contain iron or rare earths or other magnetically active materials when they are made. This magnetism can be treated as "background" and the separation can be affected by the fact that the catalyst will become even more magnetic as additional magnetically active ions or elements are deposited on it over time. Nickel, which is deposited deleteriously on the catalyst or sorbent from residual oil feeds, is itself magnetic as shown in FIG. 7. Since nickel will be deposited in proportion to time, this additionally assists in removing the more spent catalyst which has been in the conversion system for the longer time.

Preferred catalyst has a nickel equivalent metals content excluding iron of 100 ppm or greater, more preferably 500 ppm or greater, and most preferably 1,000 ppm or greater.

Feed

Feeds used with the present invention can be any oil suitable for cracking in the presence of any catalyst which loses activity over time. Preferred usage is with any sort of metal-containing feed because it is these feeds which tend to gradually coat the catalyst with metal rendering it less active over a period of time. The same effect holds true for the sorbents used in processes such as the Art® metal removal system taught, for example, in U.S. Pat. Nos. 4,263,128, 4,243,514 and 4,256,567.

Feeds can be those variously called residual oils, topped crudes, extremely high carbo-metallic crudes such as Myan, and most preferably, reduced crudes. Any hydrocarbon feed which contains metals can be used with the invention. The most common contaminating metals are nickel, vanadium, and iron (which is often itself found in residual oils).

Preferred for the invention are feedstocks having Conradson carbon numbers greater than 0.1, more preferably greater than 1, and most preferably greater than 2, and having API gravity between about 5 and 50, more preferably 10 and 40, and most preferably between 15 and 30.

Apparatus

The apparatus used with the present invention can be the High Gradient Magnetic Separation (HGMS) system described in U.S. Pat. No. 4,406,773, the superconductivity magnetic manufactured by Eriez, and most preferably the rare earth roller magnet described in co-pending patent application U.S. Ser. No. 07/332,079. Several manufacturers including Sala Magnetics and their successors, and Eriez, Inc., and their standard commercial models can be used. The carousel model of Sala Magnetics is especially effective because it is in essence a batch method in which individual portions of catalyst are successively subjected to magnetic fields for separation.

Typical commercial types include the High Gradient Cyclic Magnetic Separator (HGCMS), such as produced by Eriez Magnetics, or a Continuous Carousel Magnetic Separator manufactured by Sala Magnetics, Inc., both of which are capable of achieving 20,000 Gauss magnetic gradient. It may also consist of a Superconductor Cyclic Magnetic Separator produced by Eriez and which is capable of cyclic operation to 50,000 Gauss. Alternate means of separation are the so-called Rare Earth Roller Magnetic Separator (RERMS) and Ferrite Roller Magnetic Separator as manufactured by Eriez Magnetics.

The magnetic field is preferably in the range of about 5,000 to 50,000 gauss, preferably in a super conductor high gradient electromagnetic separator (SCHGMS), and even more preferably in the range of 10,000 to 30,000 gauss.

Magnetically Active Moieties (MAM)

The most preferred magnetically active moiety is iron and its compounds and manganese and chromium and their compounds and/or combinations of all three are also preferred. But the invention can employ any non-deleterious element or compound moiety or combination of more than one moiety from the 57 edition of the Handbook of Chemistry and Physics, pages E122 through E127, preferably having a magnetic susceptibility of at least about +500, more preferably at least about +1000, and most preferably at least about $+3500 \times 10^{-6}$ cgs per one gram formula (or atomic) weight at or about 293° K., capable of deposition on catalyst or sorbent over a period of time. Such moiety or combination is preferably readily and usually, although not necessarily, converted to, for example, an oxide or sulfide, sulfate or sulfite, or in any other form as, for example, an ion, a surface reactive or inactive specie, or complex oxide as, for example, a spinel or complexed with a zeolite, or the formation or reaction with one or more other magnetically reactive species or a ternary magnetic compound possessing the above magnetic susceptibility properties after deposition on the catalyst (by reduction said additive may also be converted to the metal). The preferred forms are inorganic compounds of iron or the other MAM's or organic compounds of iron or the other MAM's. The iron or other MAM may be added as a water soluble compound which is emulsified in oil and added as an additive, or may be added as an oil soluble compound direct in the feed or injected elsewhere in the system, or may be added as a solution or slurry in an organic or other solvent. Preferably the MAM is added so as to deposit in the range of about 0.1 to 10 parts per million, more preferably 0.5 to 2, of iron, (or its equivalent with a particular MAM) for each part of nickel equivalents of metal which are deposited on the catalyst.

Preferred MAM's are ferrous sulfate, and ferric sulfate and any water soluble salts.

The MAM should not, of course, be substantially deleterious to the cracking process e.g. react with catalyst acid sites) or become magnetically inactive at 293° K. after exposure at the temperature e.g. 900° F. or more used in the cracking process.

Addition of MAM's

The MAMs may be added continuously at a rate in proportion to the average deposition of metals occurring with a particular feed and system being utilized, or may be added intermittently in a similar rate but with injections of MAM being made periodically.

Figure 1:
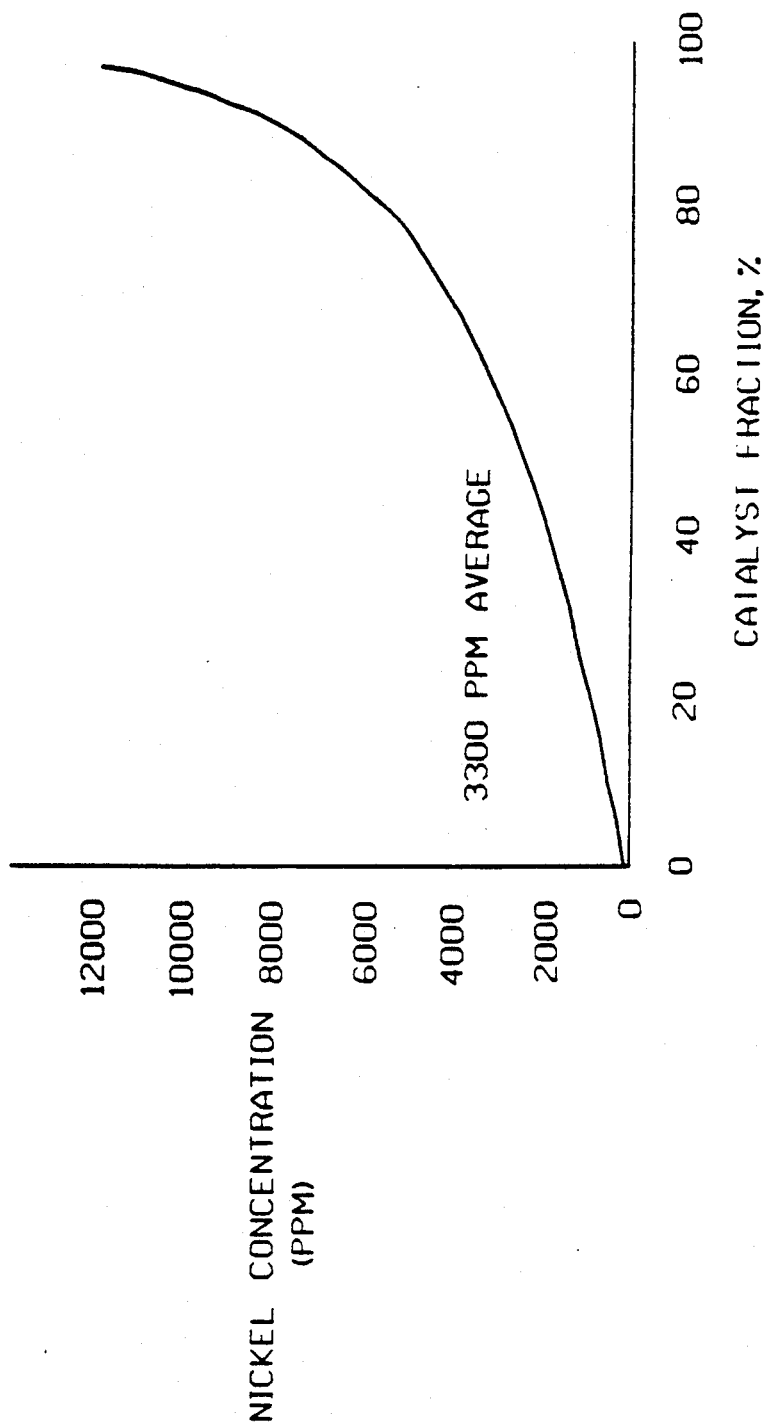
FIG. 1 is a theoretical example of one metal (nickel) distribution on these particulates as a result of constant addition of fresh particulates, and withdrawal of equilibrium particles. Those portions of the particulates, highest in metal content, have generally been in the unit for the longest period of time.

Referring to the Figures, FIG. 1 shows the metal distribution on the particulates indicating that those portions of the particulates which are highest in metal content have generally been in the unit for the longest period of time and have lost much of their catalytic or sorbent ability. Selective removal of these, of course, increases the activity of the remaining catalyst and/or sorbent and this is a major object of the present invention.

FIG. 2 shows a simplified schematic diagram of a typical riser conversion system in which a reduced crude flows into the riser at injection point 11 and/or 12 after having been injected with a portion of ferric sulfate from tank 13. The flow of ferric sulfate is controlled by valve 14 so that the iron will be 1-5 times the nickel equivalent ppm deposited on the catalyst circulating in the system. Regenerated catalyst flows through line 15 into riser reactor 16 where it meets the feed 11 which contains about one ppm vanadium, one ppm nickel, and one ppm iron for a total metals content of 1.3 nickel equivalents. The catalyst and feed flow in plug-flow, taking about 1.5 seconds to reach separator 17 where the cracked vaporous products 18 are separated from the catalyst now contaminated with vanadium, nickel and iron for a total nickel equivalents in the equilibrium catalyst of about 1000 ppm nickel equivalents. The spent catalyst 19 flows through conduit 19 into the regenerator 20 where it is regenerated with air 21 which burns off the coke. Hot regenerated catalyst flows through conduit 15 into separator 23 in which valve 24 is set to remove about 25 percent by weight of the catalyst flowing through conduit 22. The remaining catalyst returns to the riser for contact with further feed. The catalyst separated out flows through cooler 25 and onto belt 26 then past magnetic roller 27 which separates the more magnetic portions from less magnetic portions into four separate portions each more magnetic than the next (28, 29, 30, 31 are each successively less magnetic). The number of portions returned to the catalyst make-up injection inlet 32 to be mixed with fresh make-up catalyst and recycled through the system, is dependent on the particular operating characteristics of the system with the particular feed and catalyst being employed. Generally the most magnetic 80%, more preferably 50%, and most preferably 30 or lower weight percent of the catalyst will be discarded and the remainder recycled back through catalyst make-up inlet 32. The microactivity test (MAT) activity, as measured by the usual standard tests, indicates that the more magnetic portion which is discarded has a MAT activity (as defined in U.S. Pat. No. 4,536,281, FIG. 14) which is substantially lower and a metals content which is substantially higher than the other portion, which is recycled. Discarding the more magnetic portion raises the activity of the total equilibrium catalyst charge in the system and substantially reduces the amount of make-up catalyst required to be added periodically.

FIG. 3 shows a section view of a portion of the riser 16 showing magnetic particles (solid black), less magnetic particles (white circles), and vapors (indicated by wavey vertical lines) moving in plug flow up the riser. The particles may be sorbent or catalyst or both intermixed. The average metal on catalyst of the non-magnetic particles is usually 50-90% of the average metal content of the magnetic particles and preferably 60 to 85%.

Figure 4:
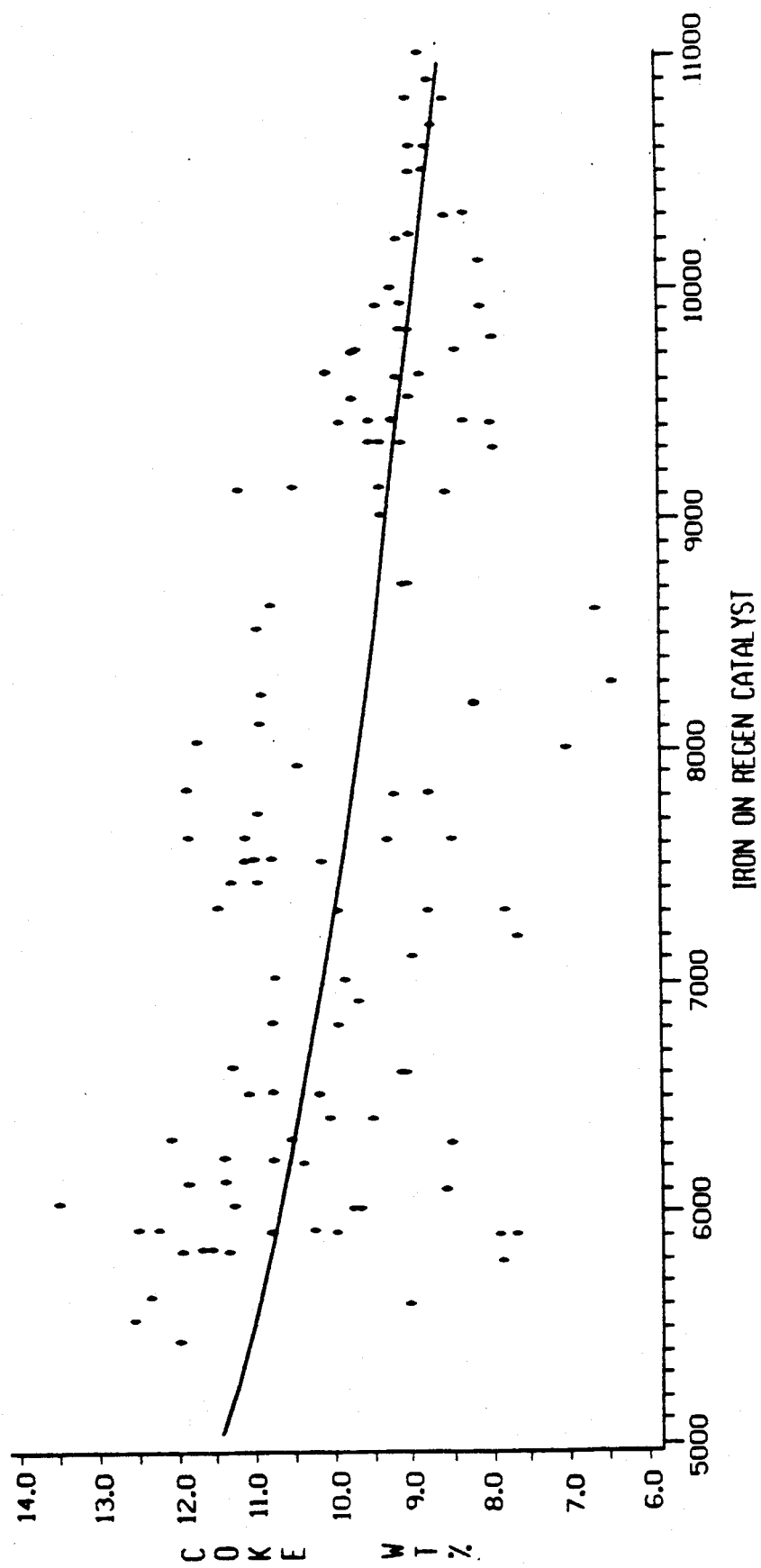
FIG. 4 is a computer-generated plot of coke weight percent versus iron on regenerated catalyst for a major hydrocarbon conversion unit cracking reduced crude and other residual oils, showing that as the iron increases, it decreases, or at least does not increase, the coke-make, contrary to the conventional wisdom of the past.
Figure 5:
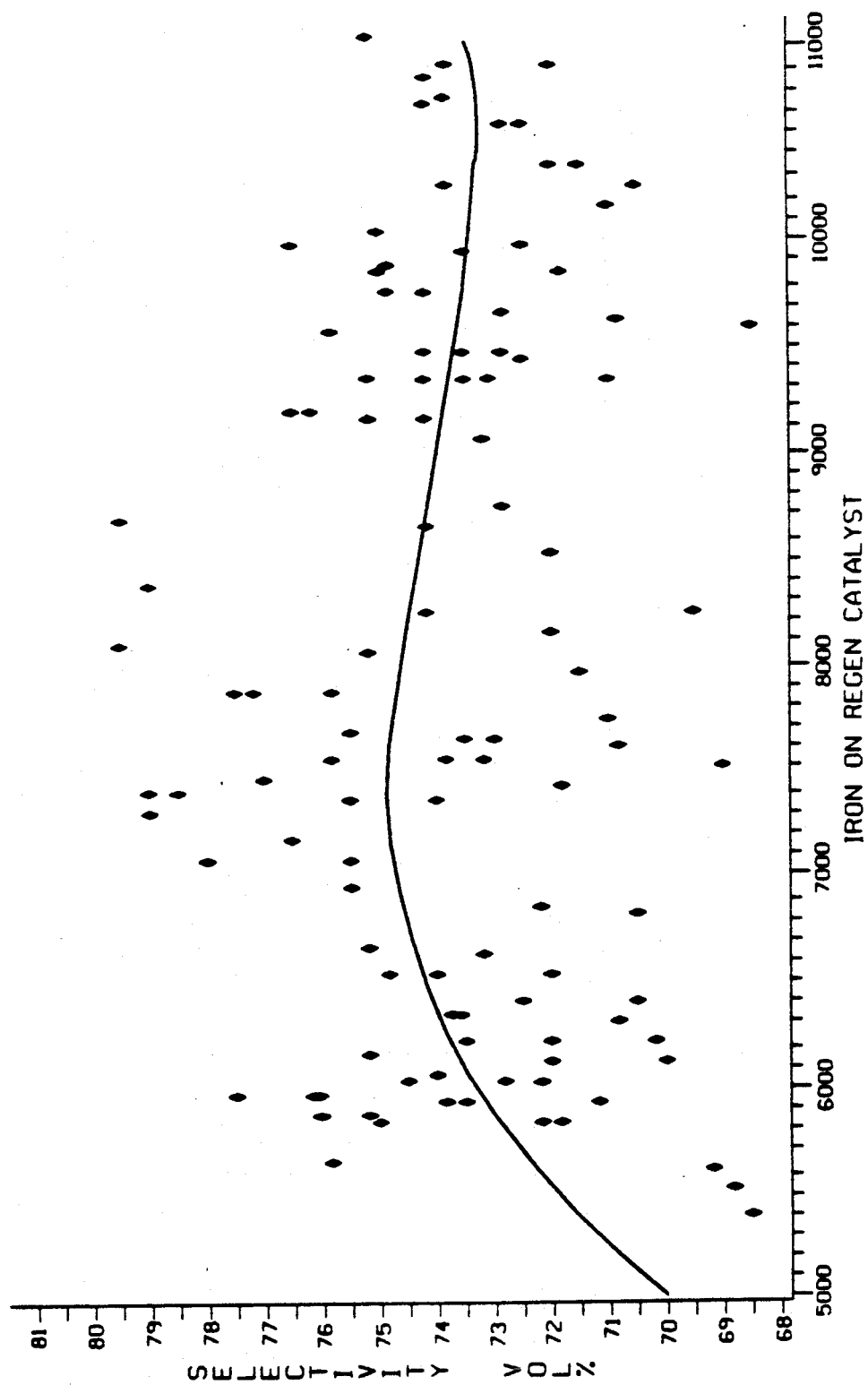
FIG. 5 is a computer-generated plot of selectivity in volume percent versus iron on regenerated catalyst for a major hydrocarbon conversion unit cracking reduced crude and other residual oils, showing that increased iron activity does not decrease, the selectivity, contrary to the conventional wisdom of the past.
Figure 6:
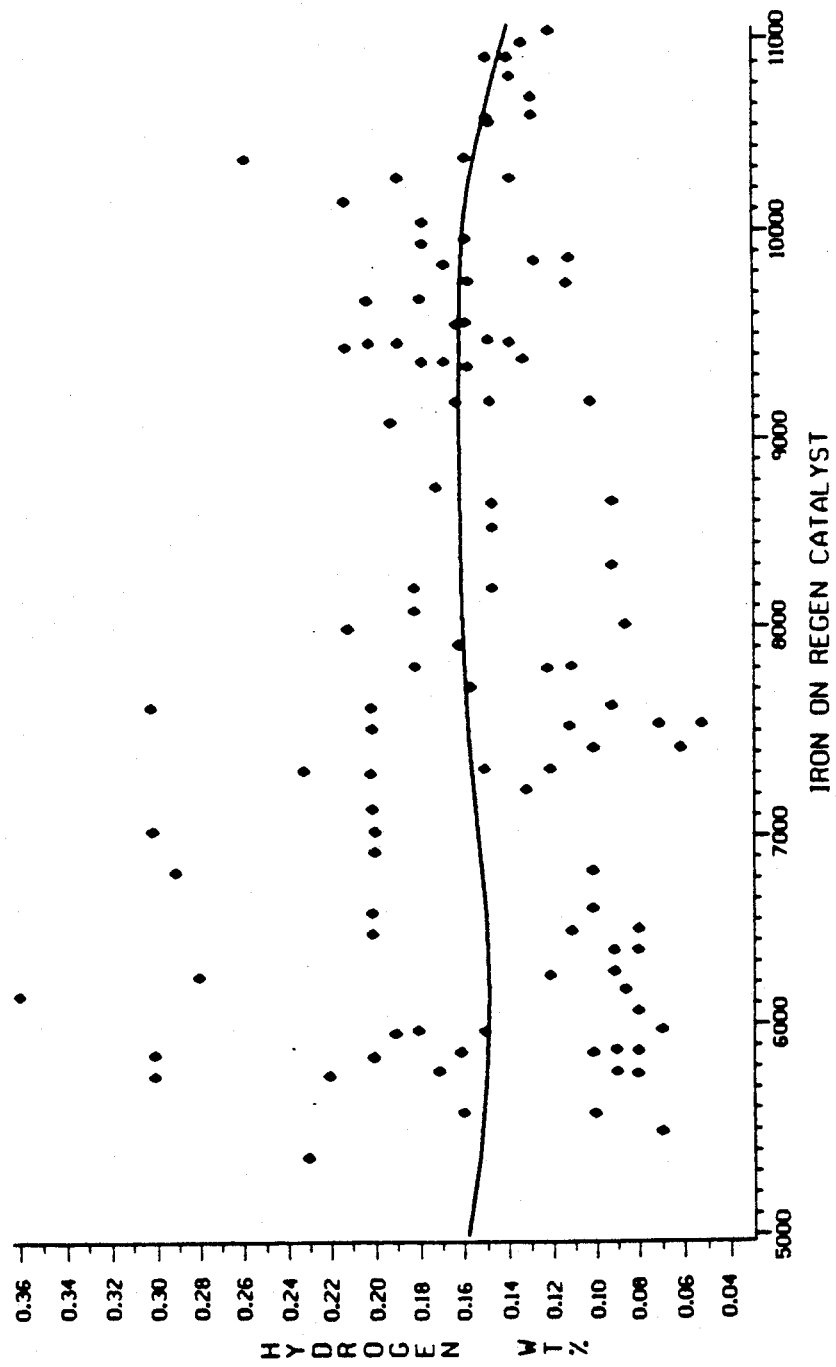
FIG. 6 is a computer-generated plot of hydrogen weight percent versus iron on regenerated catalyst for a major hydrocarbon conversion unit cracking reduced crude and other residual oils, showing that iron decreases, or at least does not increase, the hydrogen production, contrary to the conventional wisdom of the past.

Referring to FIGS. 4-6, these show that the addition of iron, conventionally thought to be highly deleterious, has little effect on coke-make, gasoline selectivity, and hydrogen-make (gasing), respectively.

FIG. 7 shows that the more magnetic portions discarded from the system shown in FIG. 2 are high in vanadium and in iron, and somewhat higher in nickel. It is an important feature of the invention that, contrary to the mathematical expression for nickel equivalents which is conventionally employed, vanadium has been found to be even more deleterious than nickel, and its removal from the system substantially enhances the catalyst life and reduces the need for make-up catalyst.

Temperature

Though not narrowly critical, temperature can be used to enhance the process because magnetic susceptibility increases as temperature decreases, with most materials. Preferred temperature ranges are about −200° F. to +400° F., more preferably 100° F. to 400° F., and most preferably −50° F. to +250° F.

Magnetic Split and Recycle

With most crudes and catalyst it is preferable to discard from about 1–30, more preferably 3–25, and most preferably 5–15 wt. % of the regenerated catalyst to the magnetic separator. The wt. % sorbent rejected by the magnetic separator is preferably from about 5–50, more preferably about 10–35, and most preferably 15–30% by weight. Economics, desired MAT activity and other factors will affect the optimum split. Discarded catalyst may be processed for metal recovery where economical. Remaining catalyst and sorbent is preferably recycled to the same or another conversion system.

EXAMPLE 1

Referring to FIG. 2, reduced crude representing the bottoms derived from distilling off a portion of crude oil 10 enters the riser reactor at 11 after mixing with a metal additive from valve 14 of tank 13. In the riser the reduced crude contacts regenerated catalyst returning from the regenerator line 15 and travels up the riser 16 cracking the reduced crude and generating product 18 and spent catalyst in separator 17 which is contaminated with coke and metals from the reduced crude. The spent catalyst enters the regenerator 20 via line 19 and is oxidized with air 21 to burn off coke and thereby regenerate the catalyst for return to the riser 16. About 8% of the regenerated catalyst is diverted through valve 24 to catalyst cooler 25 and to feed to magnetic separator, where it falls onto belt 26, moves past roller 27, a high intensity rare earth-containing permanent magnetic roller which splits the catalyst into two or more portions 28 to 31. The more magnetic (more metal-contaminated) portions, e.g. 28, and/or 28 and 29 are rejected for chemical reclaiming, metals recovery, or disposal. The less magnetic (less metal-contaminated) portions 30 and 31 travel through line 33 back to the regenerator 20.

Table I shows an analysis and is a typical example of an equilibrium catalyst withdrawn from a fluid bed operation on a high metal containing reduced crude.

TABLE 1

ANALYSIS OF A TYPICAL EQUILIBRIUM
REDUCED CRUDE CATALYST
WITH HIGH IRON CONTAMINATION

| | |
|---|---|
| Iron | 1.12 wt. % |
| Nickel | 0.19 wt. % |
| Vanadium | 0.41 wt. % |

EXAMPLE 2

Table 2 shows results from a residual processing run in which the iron level was 6900 ppm on spent equilibrium conversion (RCC process) catalyst processing reduced crude. The results of magnetic separation on a Rare Earth Roller Magnetic Separator (RERMS) are shown in Table 2.

TABLE 2

| | $RCC^{sm}$ - Spent Catalyst | | | | |
|---|---|---|---|---|---|
| | Untreated | Magnetically Separated Product | | | |
| | Sample | NMag | Mid | Mid | Mid | Mag |
| Yield, Wt. % | — | 24.6 | 21.3 | 18.7 | 17.4 | 18.0 |
| Vandadium, Wt. % | 0.37 | 0.31 | 0.34 | 0.36 | 0.39 | 0.46 |

TABLE 2-continued

| | $RCC^{sm}$ - Spent Catalyst | | | | |
|---|---|---|---|---|---|
| | Untreated | Magnetically Separated Product | | | |
| | Sample | NMag | Mid | Mid | Mid | Mag |
| Nickel, Wt. % | 0.12 | 0.10 | 0.12 | 0.13 | 0.15 | 0.20 |
| Iron, Wt. % | 0.69 | 0.64 | 0.67 | 0.70 | 0.72 | 0.87 |
| Carbon, Wt. % | 1.06 | 1.26 | 1.14 | 1.04 | 0.95 | 0.87 |
| Surface Area, m²/g | 84 | 88 | 85 | 80 | 76 | 71 |
| Ratio V/Fe | 0.54 | 0.48 | 0.51 | 0.51 | 0.54 | 0.53 |
| Ratio V/Ni | 3.1 | 3.1 | 2.8 | 2.8 | 2.6 | 2.3 |

In this example iron concentration varies from 6400 ppm at the non-magnetic low metal level to 8700 ppm at the highest level, for an increase of 2300 ppm, while nickel increases from 1200 ppm to 2000 ppm (an increase of 800 ppm). Thus, iron beneficiation is 2.9 times as great as Ni beneficiation. Obviously, beneficiation (separation) is, in a major way, dependent on the magnetic properties of the iron content.

EXAMPLE 3

Table 3 shows results from essentially the same catalyst as example 2 after being regenerated under commercial operating conditions, wherein catalyst which contains 7100 ppm iron is subjected to magnetic separation. The separation shows an increase from 5800 ppm iron in the non-magnetic portion to 8800 ppm iron in the high magnetic portion, an iron beneficiation of 3000 ppm. Nickel, on the other hand, present at 1400 ppm in the untreated sample, is 800 ppm in the non-magnetic portion and 1900 ppm in the magnetic portion, for a nickel beneficiation of 1100 ppm. Again there is an Fe/Ni beneficiation ratio of 2.7, showing again the effectiveness of iron in facilitating separation.

TABLE 3

| | $RCC^{sm}$ - Regenerated Catalyst | | | | | |
|---|---|---|---|---|---|---|
| | Untreated Sample | NMag 2 × 1 | Mid 2 × 2 | Mid 2 × 3 | Mid 2 × 4 | Mag 2 × 5 |
| Yield, Wt. % | — | 11.7 | 17.9 | 42.1 | 11.6 | 16.7 |
| Vanadium, Wt. % | 0.36 | 0.26 | 0.34 | 0.35 | 0.40 | 0.44 |
| Nickel, Wt. % | 0.14 | 0.08 | 0.13 | 0.12 | 0.16 | 0.19 |
| Iron, Wt. % | 0.71 | 0.58 | 0.67 | 0.68 | 0.76 | 0.88 |
| Carbon, Wt. % | 0.05 | 0.08 | 0.05 | 0.05 | 0.05 | 0.05 |
| Surface Area, m²/g | 97 | 113 | 94 | 92 | 89 | 81 |
| Ratio V/Fe | 0.51 | 0.45 | 0.51 | 0.51 | 0.53 | 0.50 |
| Ratio V/Ni | 2.6 | 3.3 | 2.6 | 2.9 | 2.5 | 2.3 |

EXAMPLE 4

Table 4 shows results from a run on an Engelhard ARTCAT® sorbent from the (ART®) process. The ART process is a process developed for asphalt and metal removal from reduced crude in a fluid bed contacting operation (See U.S. Pat. Nos. 4,263,128, 4,243,514 and 4,256,567). Here the iron level at the low magnetic end is 5700 ppm for an ARTCAT® sorbent containing 8200 ppm iron, while the high magnetic end contained iron at 12200 ppm for an iron beneficiation of 6500 ppm. Nickel, with a 3200 ppm level in equilibrium material, increases from 2100 on the low magnetic fraction to 4000 ppm in the high magnetic side, showing a nickel beneficiation of 1900 ppm, compared with iron with an increase of 6500 ppm. Here again, the ratio of Fe/Ni beneficiation is 3.4. Clearly, beneficiation is much more readily achieved due to iron content than nickel content.

TABLE 4

|  | Untreated Sample | MRS Sorbent | | | | | |
|---|---|---|---|---|---|---|---|
|  |  | NMag | Mid | Mid | Mid | Mid | Mag |
| Yield, Wt. % | — | 16.6 | 16.6 | 16.6 | 16.6 | 16.6 | 16.6 |
| Vanadium, Wt. % | 1.07 | 0.88 | 0.90 | 1.17 | 1.49 | 1.56 | 1.52 |
| Nickel, Wt. % | 0.32 | 0.27 | 0.31 | 0.38 | 0.35 | 0.39 | 0.44 |
| Iron, Wt. % | 0.82 | 0.70 | 0.71 | 0.83 | 1.04 | 1.16 | 1.28 |
| Ratio V/Fe | 1.3 | 1.3 | 1.3 | 1.4 | 1.4 | 1.3 | 1.5 |
| Ratio V/Ni | 3.3 | 3.2 | 2.9 | 3.1 | 4.3 | 4.0 | 3.5 | weekly low iron runs, and 5.2 wt. % and 5.0 wt. % for the two high iron runs. This shows that the additional iron does not cause an increase in coke make. $H_2$ is up slightly, increasing about 20 SCF/bbl. for the higher metal catalyst. However, nickel, a notorious hydrogen producer and vanadium, a less active hydrogen producer, are both up (approximately 300 to 500 ppm nickel and 600 ppm vanadium). Contrary to conventional wisdom, this data shows that adding large amounts of iron to the catalyst is not detrimental to catalyst activity or yield of valuable products (selectivity). Therefore, intentionally adding iron in order to increase iron content, and thereby enhance magnetic beneficiation, is shown to be technically sound. Note also that even the expensive virgin catalysts used in commercial hydrocarbon conversion operations start out with natural iron levels of 3000 to 4500 ppm (kaolin clay component) and further confirms that iron is not considered harmful even in expensive sophisticated fresh conversion catalysts.

TABLE 5

| | IRON PPM | | | | | |
|---|---|---|---|---|---|---|
| | Iron Content | | | | | |
| RCC DATA | 72–7500 ppm 2 wk. period | | | 10330–10930 ppm 2 wk. period | | |
| DATE (A) | Week #1 | Week #2 | Avg. | Week #3 | Week #4 | Avg. |
| TOTAL CHG. B/D | 32460 | 31900 | | 38130 | 37430 | |
| Conversion Total | 67.4 | 68.8 | 68.1 | 68.2 | 69.9 | 69.0 |
| Gaso. Efficiency | 73.5 | 73.1 | 73.3 | 69.8 | 75.9 | 72.9 |
| Yields: Dry Gas wt % | 3.7 | 4.0 | 3.8 | 3.7 | 3.9 | 3.8 |
| DRY GAS-FOE vol % | 4.0 | 4.1 | 4.1 | 4.1 | 4.3 | 4.2 |
| C3-C4 vol % | 22.9 | 23.0 | 23.0 | 24.7 | 20.6 | 22.7 |
| C5-430 EP vol % | 49.6 | 50.3 | 49.9 | 47.6 | 53.0 | 50.3 |
| 430-630 EP vol % | 18.8 | 17.0 | 17.9 | 19.7 | 18.8 | 19.2 |
| 630+ SLURRY vol % | 13.8 | 14.2 | 14.0 | 12.1 | 11.4 | 11.7 |
| COKE wt % | 9.3 | 9.7 | 9.5 | 8.7 | 8.7 | 8.7 |
| H2 scf/bbl | 72 | 75 | | 96 | 95 | |
| RX TEMP deg F. | 975 | 975 | | 971 | 971 | |
| FEED to RISER deg F. | 280 | 268 | | 308 | 313 | |
| REGEN BED deg F. | 1333 | 1332 | | 1331 | 1330 | |
| CAT/OIL RATIO #/# | 7.5 | 7.5 | | 8.2 | 8.3 | |
| Delta Coke-Wt. % | 1.24 | 1.29 | | 1.07 | 1.05 | |
| SULFUR wt % | 2.2 | 2.6 | | 2.1 | 2.1 | |
| UOPK | 11.5 | 11.4 | | 12.0 | 11.7 | |
| RBC wt % | 4.1 | 3.9 | 4.0 | 3.5 | 3.7 | 3.6 |
| <650 deg F. | — | — | | — | — | |
| CAT ANALYSES | | | | | | |
| Fe ppm | 7500 | 7200 | | 10930 | 10330 | |
| Ni ppm | 1330 | 1500 | | 1870 | 1870 | |
| V ppm | 3630 | 3670 | | 4270 | 4230 | |
| Feed N, ppm | 5 | 6 | | 6 | NA | |
| Feed V, ppm | 6 | 8 | | 16 | NA | |

EXAMPLE 5

This example show that iron has little or no effect on catalyst performance. The data is taken from commercial operation on an RCC residual crude processing unit, during a period when iron level on catalyst is at 10,330 ppm as a result of processing high iron contaminated crude. In a similar run, iron level is maintained at 7200-7500 ppm. For both of these periods, nickel and vanadium content are quite similar. Comparison of runs made at low and high iron levels, each over a period of two weeks is shown in Table 5. The results show that even though there is about 3000 ppm more iron on the high iron catalyst during the high iron two week period, there is little change in conversion or gasoline efficiency and the yields of all products compare very closely. The resultant coke make (wt. % coke—Ramsbottom Carbon)=5.2 wt. % and 5.8 wt. % respectively for the two

EXAMPLE 6

In this example, Table 6, commercial runs are both of approximately 37000 barrel per day on a mixture of vacuum bottoms, reduced crude, lube oil extract, vacuum tower heavy gas oil and bulk distillate and are made in consecutive weeks with iron rising 830 ppm in one week (from 9500 to 10330 ppm) and nickel and vanadium increasing only slightly. The results show that conversion and gasoline efficiency are essentially unchanged, with gasoline yield actually even slightly higher at the higher metal level. Coke make (coke wt. %—RB carbon wt. %) was 5.0 wt. % for the higher iron catalyst, and was desirably lower than the 5.4 wt. % for the lower iron level catalyst, thus again showing that an increase in iron is not harmful. $H_2$ increased, only 7 CF/bbl. an amount well within experimental error.

TABLE 6

RCC DATA

| | Run | |
|---|---|---|
| | 6A<br>Higher Iron | 6B<br>Lower Iron |
| TOTAL CHG. B/D | 37430 | 37020 |
| WORF Feed | 360 | 550 |
| VAC BTMS | 4480 | 4300 |
| Reduced Crude | 11070 | 11600 |
| No. 4 Vac Btms | 0 | 0 |
| Lube Plt Extract | 3820 | 3480 |
| LVT HVGO | 6530 | 6240 |
| Bulk Dist. | 11170 | 10850 |
| Trtd Fd-From MRS | 0 | 0 |
| Conversion-Total | 69.9 | 69.4 |
| Gaso. Efficiency | 75.9 | 75.8 |
| Yields: Dry Gas wt % | 3.9 | 3.8 |
| DRY GAS-FOE vol % | 4.3 | 4.0 |
| C3-Cr vol % | 20.6 | 19.9 |
| C5–430 EP vol % | 53.0 | 52.6 |
| 430–630 EP vol % | 18.8 | 20.2 |
| 630+ SLURRY vol % | 11.4 | 10.4 |
| COKE wt % | 8.7 | 9.5 |
| VOLUME GAIN % | +3.7 | +3.1 |
| H2 scf/bbl | 95 | 88 |
| H2/Cl RATIO | 0.98 | 0.91 |
| RX TEMP deg F. | 971 | 971 |
| FEED to RISER deg F. | 313 | 314 |
| REGEN BED deg F. | 1330 | 1332 |
| CO2/CO RATIO | 6.5 | 6.5 |
| CAT/OIL RATIO #/# | 8.3 | 8.2 |
| Delta Coke wt % | 1.05 | 1.16 |
| FEED GRAV-deg API | 21.0 | 20.4 |
| SULFUR wt % | 2.1 | 2.3 |
| UOPK | 11.7 | 11.5 |
| RBC wt % | 3.7 | 4.1 |
| <650 deg F. | — | — |
| CAT ANALYSES | | |
| Fe ppm | 10330 | 9500 |
| Ni ppm | 1870 | 1750 |
| V ppm | 4230 | 3950 |
| SA m2/g | 114 | 121 |
| Pv cc/g | 0.29 | 0.28 |

EXAMPLE 7

In another experiment, 80 grams of reddish appearing (iron contaminated) equilibrium catalyst containing iron, nickel and vanadium having a similar iron content (11,600 ppm) as used in the previous example, is mixed thoroughly with 20 gms. of grayish white colored virgin FOC-90 (Filtrol Corp.) catalyst, containing approximately 4,000 ppm of iron and essentially no nickel. The mixture is subjected to magnetic separation by processing over a rare earth roller magnetic separator, with a steel belt (to eliminate or reduce electrostatic charge which interferes with magnetic separation) (0.00311 thick) 6" wide, at a speed of 150 fpm feet/minute, and 5 lb/hr/in of belt width with a splitter placed to properly catch the two fractions. Two portions, (1) 19.8 gms. of absolutely clean grayish white virgin catalyst, and (2) 80.2 gms. of reddish high iron catalyst were recovered from the mixture after magnetic processing. This shows the effectiveness of the magnetic separation method. Table 7 shows the composition of both fractions before mixing, and after separation, and strikingly demonstrates how a high concentration of iron in old catalyst can almost completely achieve magnetic separation from new fresh catalyst for recycle and rejection of old catalyst for disposal. This experiment ideally illustrates how effective magnetic beneficiation can be.

This experiment not only demonstrates how efficient magnetic separation can be (1% loss of virgin catalyst) but also how clean the separation can be. It is apparent that the composition of the two fractions remain essentially the same as before blending, confirming an absence of cross carryover. Comparison of the color of the two ingredients before mixing and after separation also showed them to be identical, a dramatic demonstration of the effectiveness of magnetic separation.

TABLE 7

SEPARATION OF BLENDED VIRGIN AND EQUILIBRIUM REDUCED CRUDE CATALYST

1. Blended mixture of 20 wt. % FOC-90, 80 wt. % Equilibrium RCC Catalyst analyses of each catalyst.
   Pre mixture chemical analyses

| | Fe ppm | Ni ppm | V ppm |
|---|---|---|---|
| Virgin FOC-90 | 4,800 | 300 | <100 |
| Equil. RCC Cat | 11,200 | 1,900 | 4,300 |

2. Recovery — Recovered fractions - Chemical Analysis

| | Fe ppm | Ni ppm | V ppm |
|---|---|---|---|
| 19.8 wt. % NM portion (FOC-90) | 4,900 | 300 | <100 |
| 80.2 wt. % M portion (RCC Cat) | 11,600 | 1,900 | 4,100 |

EXAMPLE 8

In ARTCAT ® sorbent, Example 4, analyses of the products from splitting equilibrium catalyst by magnetic separation into six equal cuts show also how iron and vanadium maintain a close and constant relationship. Normally vanadium, if not immobilized, will spread rapidly from old catalyst particles to new catalyst particles, thereby rapidly shifting the relationship of vanadium to iron, as well as nickel. Therefore, the ratio V/Ni in the low magnetic, low nickel cuts should be high relative to Ni in the high nickel, high magnetic cuts. However, FIG. 7 portrays the analytical comparison of the various magnetic cuts of ARTCAT loaded with nickel, iron and vanadium. The data in Table 4, as well as the following FIG. 7 show how closely iron and vanadium track each other in a 1.3/1 ratio, thus also demonstrating iron's ability to immobilize vanadia under optimized operating conditions. Note also in Table 4 that the ratio of vanadium to nickel is lower on fresher and lower metal containing catalysts, and higher on old catalyst. This therefore, suggests that iron tends to immobilize vanadium as otherwise, as mentioned above mobile vanadium from older catalyst particles would tend to transfer to lower nickel containing newer catalyst and thus increase the vanadium to nickel ratio as it does in Tables 2 and 3 on RCC catalyst where the iron level and more importantly the incremental iron level (iron in equilibrium catalyst minus iron in virgin catalyst) is much lower than in the ARTCAT ® sorbent.

Evidence obtained on spent RCC (Table 8) by Electron Spectroscopy Chemical Analysis (ESCA) analysis shows that vanadium can be maintained in a non-mobile form either by immobilization with iron or by keeping it in a reduced plus four state by keeping a small amount of carbon on regenerated particulate. This plus four state is less detrimental to the molecular sieves on which most conversion catalysts are based. Iron's ability to immobilize vanadium, while at the same time enhancing separation, provides another way of controlling vanadium and adds another unexpected benefit to use of iron.

TABLE 8
EQUILIBRIUM RCC CATALYST VANADIUM VALENCE ANALYSIS BY ESCA

| RCC Catalyst | Relative Amounts* | | |
|---|---|---|---|
| | $V^{+3}$ | $V^{+4}$ | $V^{+5}$ |
| 1. Spent-as received 1.04% coke | 1 | 5 | 1 |
| 2. Commercial regeneration 0.2% coke | 2 | 4 | 2 |
| 3. #1-reduced in $H_2$ 385° C. 1 hr 5 atm | 2 | 6 | 2 |
| 4. #1-lab regenerated in air 1200° F. 4 hrs | 1 | 2 | 5 |
| 5. #4-lab regenerated plus $H_2$ 385° C. 1 hr 5 atm | 1 | 10 | 1 |

*This data shows the relative ($V^{+3}$, $V^{+4}$, $V^{+5}$) amount of each vanadium valence, as determined by comparing the relative areas under specific and characteristic vanadium valence peaks as measured by ESCA analysis.

The above results show than in operation, vanadium if maintained in a slightly reduced state (0.2% coke on regenerated RCC Catalyst) tends to exist in the plus four valence state, and as the data shows, is retarded in redispersing from one catalyst particle to another.

In studying magnetic separation on ARTCAT (FIG. 2, Table 4), iron and vanadium are closely paired suggesting iron is forming a ferrous compound with four valence vanadium. Vanadium having a plus four valence may form an immobilizing compound with iron, probably $Fe^{+2}$ because of the reducing environment. Hence, the combination of adding iron and keeping a small amount of coke on regenerated catalyst, may also be especially effective in controlling vanadium. In effect, the addition of iron not only assists in magnetic separation, but simultaneously may serve to control the zeolite destructive properties of vanadium in cracking catalysts.

EXAMPLE 9

In the past when operating on gas oil in the preriser, prezeolite cracking era, iron was always considered an undesirable poison, along with nickel, vanadium, and copper. Today, using the latest hydrocarbon conversion technology, including a much more active zeolite promoted and stable catalyst, lift gas and a very short contact time riser reactor, catalytic cracking of carbo-metallic feedstocks appears not to be substantially hurt by iron. Taking the results of 116 weight balance tests on a reduced crude converter over a six year period and plotting selectivity, hydrogen, and coke make versus iron content, and making a regression analysis of all data shows that selectivity (yield of gasoline—divided by conversion) remains at 74% with iron ranging between 6,000 to 11,000 ppm as shown in FIG. 5. Hydrogen make, a sensitive measure of contamination, also remains constant at 0.15 wt. % between 6,000 and 10,000 ppm and actually decreases slightly at 11,000 ppm (see FIG. 6). Coke make, which is also considered a sensitive measure of metal poisoning, actually decreases from approximately 10.7 wt. % at 6,000 to 9% at 11,000 ppm (see FIG. 4). These weight balances are performed over a six-year period and include runs on a variety of residual feedstocks varying widely in metal content and Ramsbottom Carbon. The data confirm that iron is not harmful, and therefore can be used successfully in enhancing magnetic beneficiation.

EXAMPLE 10

Figure 8:
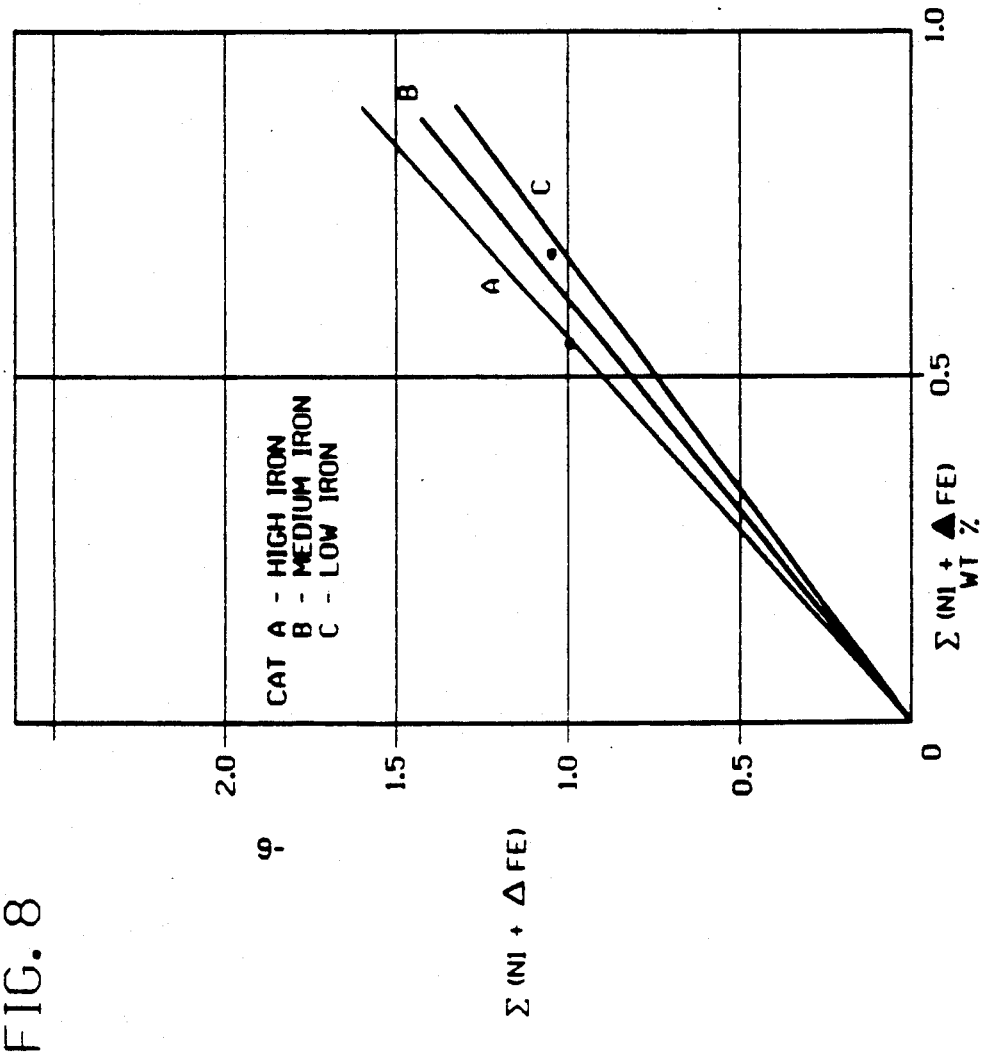
FIG. 8 is a plot showing incremental magnetic susceptibility in electromagnetic units plotted as a direct relationship against incremental iron, plus nickel.
Figure 9:
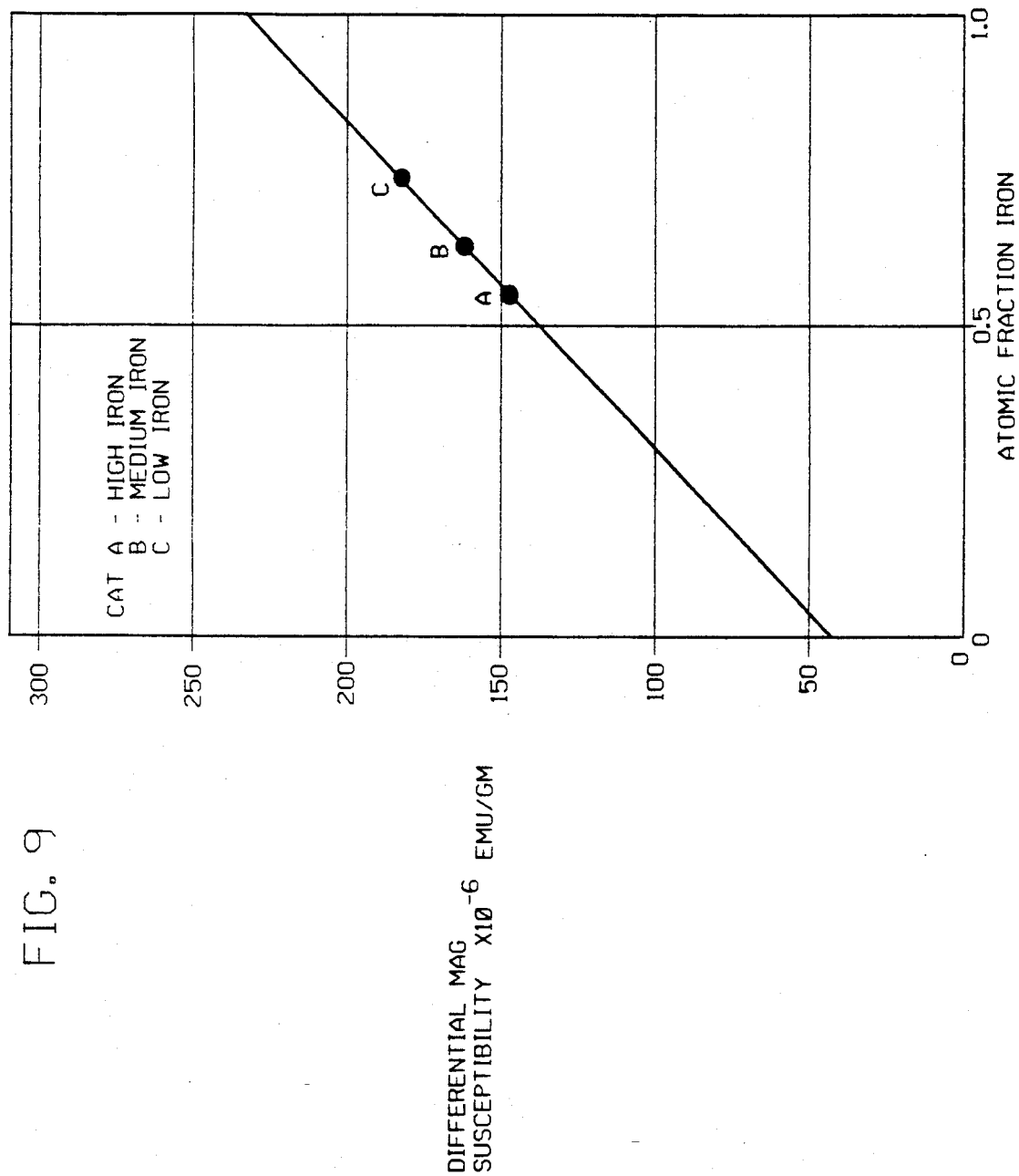
FIG. 9 is a plot showing magnetic susceptibility plotted against atomic fraction of iron showing that iron is much more magnetic than nickel.

Magnetic susceptibility measurements can be made on catalyst containing varying amounts of iron and nickel and including iron on virgin catalyst. FIG. 8 shows that a plot of incremental magnetic susceptibility in electromagnetic units can be plotted as a direct relationship between incremental iron, plus nickel. When the data is broken down into the contribution of nickel and iron (note the change in slope for three different catalysts, with varying amounts of nickel and iron in FIG. 8) as determined by a plot of atomic fraction of each (FIG. 9), it shows that iron has a susceptibility value of $225 \times 10^{-6}$ emu's at 100% iron, and nickel has a magnetic susceptibility of $42 \times 10^{-6}$ emu's at 100% nickel. Here again iron shows to be much more effective, and in this case is 5-6 times as effective as nickel in effecting beneficiation. This further confirms the effectiveness of the process.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

What is claimed is:

1. A hydrocarbon conversion system comprising in combination:
   A. a reactor in communication upstream of;
   B. means for separating spend particles from cracked products upstream of;
   C. regenerator means for removing carbon deposited on spent particles;
   D. outlet means for depositing a portion of regenerated particles to a magnetic separator;
   E. magnetic separator means for separating at least one portion of said regenerated particles higher in magnetic properties from at least one portion of said regenerated particles which is lower in magnetic properties;
   F. recycle means for recycling one or more portions of said separated portion lower in magnetic properties back to said reactor;
   G. hydrocarbon inlet means for feeding hydrocarbon to said reactor; and
   H. magnetically active additive addition means for adding magnetically active moiety to said hydrocarbon conversion system, said addition means comprising a source of magnetically active moieties;

whereby said magnetically active moiety deposits on said particles comprising regenerated or spent particles in amounts proportionate with the time said particles have been circulating in said hydrocarbon conversion system.

2. A system according to claim 1 in which said magnetic separator means comprises at least one rotating element which causes said regenerated particles to move through a magnetic field.

3. A system according to claim 1 wherein said magnetic separator means comprises at least one permanent magnet.

4. A system according to claim 1 wherein said magnetic separator means comprises at least one electromagnet.

5. A system according to claim 1 wherein said magnetic separator means comprises a belt-roller combination wherein said regenerated particles are spread onto said belt of said belt-roller combination.

6. A system according to claim 1 wherein said particles comprise regenerated or spent catalyst particles respectively.

7. A system according to claim 1 wherein said particles comprise regenerated or spent sorbent particles respectively.

* * * * *